March 10, 1936.  J. L. KOUBEK  2,033,382
LENS FOR HEAD LAMPS AND THE LIKE
Filed July 7, 1933  8 Sheets-Sheet 1

Inventor
John L. Koubek
By Blackmore, Spencer & Fish
Attorneys

March 10, 1936. J. L. KOUBEK 2,033,382
LENS FOR HEAD LAMPS AND THE LIKE
Filed July 7, 1933 8 Sheets-Sheet 4

Inventor
John L. Koubek
By Blackmore, Spencer & Flink
Attorneys

Inventor
John L. Koubek
By Blackmore, Spencer & Flint
Attorney

March 10, 1936.  J. L. KOUBEK  2,033,382
LENS FOR HEAD LAMPS AND THE LIKE
Filed July 7, 1933   8 Sheets-Sheet 7

Inventor
John L. Koubek
By Blackmore, Spencer & Hulk
Attorneys

Inventor
John L. Koubek
By Blackmore, Spencer & Flink
Attorneys

Patented Mar. 10, 1936

2,033,382

UNITED STATES PATENT OFFICE 2,033,382

LENS FOR HEAD LAMPS AND THE LIKE

John L. Koubek, Anderson, Ind., assignor, by mesne assignments, to General Motors Corporation, Detroit, Mich., a corporation of Delaware Application July 7, 1933, Serial No. 679,296

8 Claims. (Cl. 240—41.4)

This invention has to do with cover glasses or lenses used on lamps, especially headlamps of automobiles. It is directed especially to curved lenses which have recently come into extensive use under the following circumstances.

In the development of automobiles much attention has been paid to streamlining to reduce wind resistance as well as to improve the appearance of the car. In the development of such designs it is desirable to apply the same treatment to headlamps, for in the case of some of the larger lamps more than a horse power of energy has been expended in merely pushing the lamps through the air at high speed. In the streamlining of lamps the problem is presented of designing lenses of convex shape, but it has at the same time been necessary to greatly reduce the lens diameter and the radius of curvature to secure the best results in reduction of wind losses as well as in causing the lamps to conform in appearance to the rest of the car.

Thus where previously convex lenses have usually been made with diameters not less than 9" and radii of curvature not less than 12", lenses are now desired having diameters as low as from 3" to 7" with radii of curvature as low as 3" to 4". In producing such lenses a new problem was presented owing to the fact that the increased curvature in combination with the usual light spreading flutes caused rays to be thrown above or below the points where they are needed for good road illumination to an amount to be seriously objectionable. The more deeply curved the lens the greater is the difficulty encountered. It is one of the chief objects of this application for patent to disclose cover glasses or lenses in which these errors are corrected and light is directed just as effectively as in the case of the conventional flat lens.

In the drawings:

Figure 24a is a section on line 24a—24a of Figure 24.

Figure 30 is a section on either of lines 30—30 of Figure 29, while

Figures 1, 1A, 4, 5, 6:
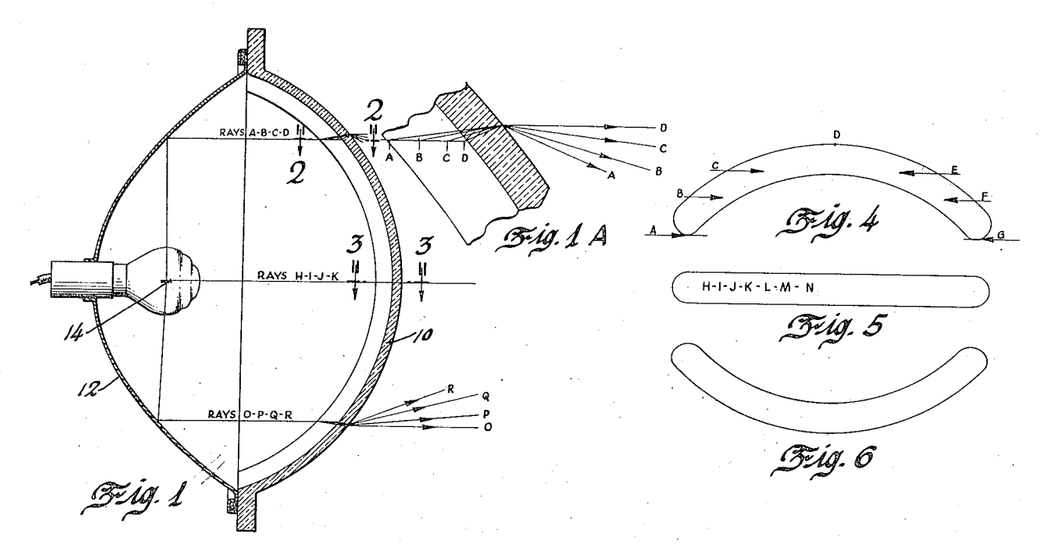
Figure 1 is a central vertical section through a headlamp equipped with a convex lens of small diameter and radius, provided with conventional concave flutes, the showing being somewhat diagrammatic to illustrate the problem which my invention solves.
Figure 1A is an enlargement of a part of Figure 1.
Figures 4, 5, and 6 are views on a reduced scale showing the beams projected by certain of the rays passing through the lens of Figure 1.
Figure 2:
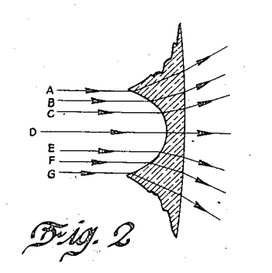
Figure 2 is a section on line 2—2 of Figure 1.
Figure 3:
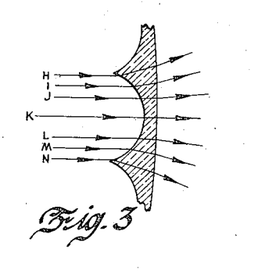
Figure 3 is a section on line 3—3 of Figure 1.

The lens or cover glass shown at 10 in Figure 1 is of conventional design and forms no part of my invention. This figure as well as Figures 2 to 10, inclusive, are used to illustrate the principles of optics involved in my invention. Lens 10 has the form of a segment of a sphere, and is provided on its interior with concave flutes as shown in Figures 2 and 3. The lamp also comprises a reflector 12 equipped with a light source 14 in the form of a filament arranged at the focus of the reflector. For the purpose of the present discussion the reflector and light source may be regarded simply as means for producing substantially parallel rays. In the conventional lamp used today several beams are projected, one high and one low, but so far as the principle of my invention is concerned, it is applicable to both beams, and performs in like manner with each of them so that it is sufficient to study the optics involved in the case of a lamp having but one light source.

I have indicated in Figure 3 rays lettered from H to N emitted from the lamp in a horizontal plane through the axis. These rays are spread horizontally, and produce a pattern such as shown in Figure 5. Owing to the fact that the rays are normal to the lens the action of the flutes is simply to spread the light as in the case of a conventional flat lens. While the flute section shown in Figure 3 has the form of an arc of a circle the section shown in Figure 2 is substantially elliptical producing greater horizontal spread of the light. This follows from the well known fact that when a cylinder is intersected by a plane at other than a right angle the resulting section is an ellipse. This additional spread somewhat changes the form of the beam projected by the lamp but, I have found, in practice, that this effect may be sufficiently controlled by selecting a suitable radius of curvature for the flutes, or by employing flutes of different radii of curvature in different parts of the lens.

In Figure 2 I have shown rays A to G, inclusive, proceeding from the reflector in a horizontal plane above the lamp axis and spread laterally by the action of the flute. However, in the case of these rays the flutes also produce dispersion of the rays in a vertical plane as shown by the beam pattern of Figure 4. In Figure 1A I have shown the vertical dispersion produced by the flute of Figure 2 on rays A, B, C, and D projected in the same horizontal plane but incident to the flute surface at different distances from the flute center line. It will be noted that ray D emerges from the lens at the same vertical angle that it entered except for slight dispersion in a vertical direction as a result of refraction. This is because the ray passes through the flute at its midportion where the sides of the lens are substantially parallel. Rays A, B, and C, however, are bent downwardly by varying amounts. As indicated on the drawings, ray A nearest the edge of the flute is deflected downwardly the greatest amount, and in general the amount of downward deflection increases with the distance from the flute center line.

The consequence of this dispersion of rays in a vertical plane is shown in Figures 4. It will be noted that the beam pattern is in the form of a rainbow, and that the extreme ends of the pattern are produced by the rays passing through the portions of the flutes nearest the edges.

Referring to the bottom of Figure 1, I have shown in like manner that rays O, P, Q, R are not only spread in a horizontal plane by the flutes but are dispersed in a vertical direction, the result being that these rays produce the pattern shown in Figure 6 having the form of an inverted rainbow. Again the extreme ends of the pattern are produced by the rays passing through the edge portions of the flutes, and the upward bending of the rays increases with the distance from the flute center line.

I have shown that the beam pattern produced by rays passing through the central horizontal plane of the lens is substantially flat, while the beam patterns produced by rays passing through the lens in horizontal planes above the axis are arched downwardly and the beam patterns produced by rays passing through the lens in horizontal planes below the axis are arched upwardly. While I have shown but three patterns to illustrate this principle, it will be understood that the same action takes place with respect to each of the parallel strata of rays of which we may imagine the beam to be composed. It is important to note that the curvature of the patterns increases with the distance of the strata from the lamp axis.

Figure 7:
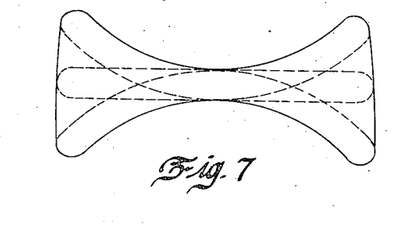
Figure 7 shows the complete beam pattern produced by the lens of Figure 1.

In Figure 7 I have shown the complete beam pattern projected by the lamp of Figure 1. This pattern is of least depth at the middle portion and is of greatest depth at the ends. A considerable amount of light at the ends of the beams will consequently be projected above the horizontal cutoff, causing objectionable glare. The depth of the center of the beam is likewise less than is desired to give adequate illumination to the center foreground. For these reasons the beam pattern of Figure 7 is unsuitable for use, and the problem is presented of so designing the lens as to produce the desired horizontal pattern.

Figures 8, 9:
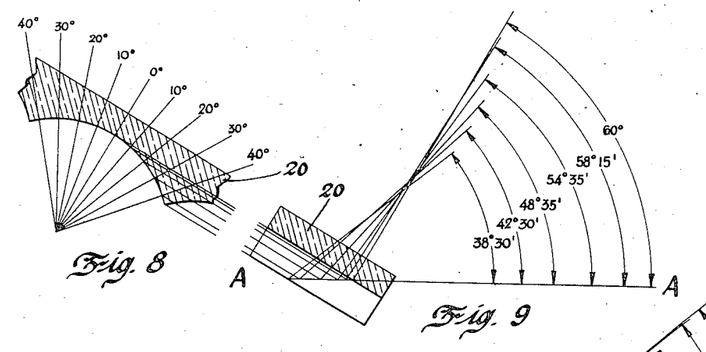
Figure 8 is a section taken through a concave flute element at right angles to its axis.
Figure 9 is a longitudinal axial section through the concave flute element of Figure 8 positioned so as to make an angle of 30° with the horizontal. The figure shows the projection on the plane of the paper of perpendiculars drawn to points of intersection of the horizontal plane A—A with the incident surface of the flute.
Figures 10, 11:
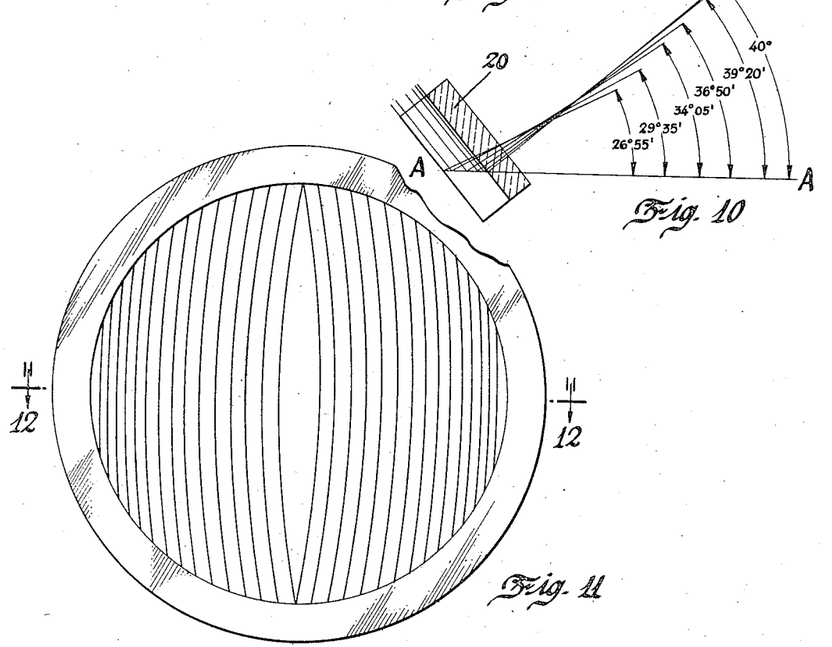
Figure 10 is a view corresponding to Figure 9 but with the flute element making an angle of 50° with the horizontal.
Figure 11 is a view of a lens made according to my invention, looking at it from the position of the light source.

Confronted with these difficulties of design, I found it necessary to carefully study the action of the flutes on the vertical direction of rays, and am setting forth the results of that study in Figures 8 to 10.

It is convenient to consider each vertically curved flute as made up of a multiplicity of small cylindrical flute elements, and I have shown one such flute element at 20 in Figures 8 to 10. I have chosen to illustrate a concave flute element but the same principles apply in the case of a convex flute element. In Figure 9 I have shown the flute element making an angle of approximately 30° with the plane A—A which corresponds to the plane of a beam of light projected by the reflector.

It is well known that in the case of any light ray passing from one medium to another the angle of refraction varies with the angle formed between the impinging light ray and the perpendicular at the point of incidence, this angle being known as the angle of incidence. In Figure 9 I have shown the projection on the plane of the paper of the perpendiculars drawn to the points of incidence on the flute element of a strata of rays projected in the horizontal plane A—A. The perpendicular referred to above is a line which is at right angles to the element of the flute, passing through the point of incidence, and which is also perpendicular to the curvature of the flute in a horizontal plane at this point of incidence. It will be noted that the vertical angles between these perpendiculars and the plane A—A vary from about 38° at the edge of the flute to 60° at the center of the flute, the dispersion therefore being about 22°. In accordance with the law of refraction the parallel light rays passing into the flute will be refracted in amounts determined by their respective angles of incidence, so that as shown in Figure 1 the rays passing through the center of the flute will be projected substantially horizontally, while as the side edges of the flute are approached the rays will be projected outwardly and downwardly to greater and greater degree. The degree of outward bending is not important for in headlamp design there may be considerable variation in lateral spread of the beam. The degree of downward bending is important for it is essential that the light be directed ahead within a vertical angle not exceeding 6° or 8° so that the limited amount of light available may be put upon the road where it helps in driving. I may therefore give most attention to vertical dispersion of the rays, noting that the dispersion decreases with increase in the vertical angle of the perpendiculars to the points of incidence, these angles being illustrated in Figures 9 and 10.

It will also be noted that the vertical dispersion in the lower half of the lens is upward while that in the upper half is downward. This obviously is because of the opposite inclination of the two halves of the lens.

It will of course be understood that the vertical dispersion shown in Figure 1 as applied to a certain horizontal strata of rays, affects each of the strata of rays of which the beam is composed, the amount of dispersion decreasing with increase in the amount that the flute element is tilted out of horizontal position. Thus in Figure 10 the flute element makes an angle of 50° with the vertical as compared with 30° in the case of Figure 9. The projections of the perpendiculars in Figure 10 vary from a minimum of about 27° to a maximum of about 40°, the dispersion therefore being about 13°. The curvature of the rainbow of light projected through the flute element of Figure 10 will therefore be much less than the curvature of the rainbow of light projected through the flute element of Figure 9.

In the case of the lens of Figure 1 the amount of dispersion will therefore vary from zero in the horizontal plane including the lamp axis to a maximum at the top and bottom of the lens.

It will be apparent from the foregoing that the vertical angle which each ray of light passing through the lens of Figure 1 makes with the horizontal depends upon a number of factors among which the following are the most important: the curvature of the lens; the width and radius of curvature of the flutes,—these two factors determining the "spread" of the flutes; the distance of the point of incidence from the center line of the flute; and the distance of this point from the horizontal plane through the lamp axis.

The problem is to so design the flutes as to remove or minimize this undesired vertical dispersion. Obviously, however, in some cases it may be found desirable to permit a certain amount of this action to smooth the beam, and it is to be understood that my invention is not limited to the use of the new principles of design in all portions of the lens, but it may be employed in some portions and not in others as may be found most desirable.

I have accomplished the correction of lenses to remove the undesired vertical dispersion by two different methods of treatment. According to one method I provide the lens with flutes the spread of which decreases as the top or bottom of the lens is approached. It will be remembered that the vertical dispersion is greatest at the top and bottom of the lens. By using flutes of small spread at these portions of the lens the vertical dispersion may be reduced to so small an amount as to be unobjectionable. Obviously, this method does not afford a complete correction of the trouble. I have described and claimed the method in my copending application Serial No. 676,821 filed June 21, 1933.

The method I prefer consists in canting the flutes out of normal vertical position, when viewed from the front of the lamp, in such a direction and to such an extent as to correct the vertical dispersion so that substantially all rays passing through the lens will be projected in substantially parallel lines.

Figure 12:
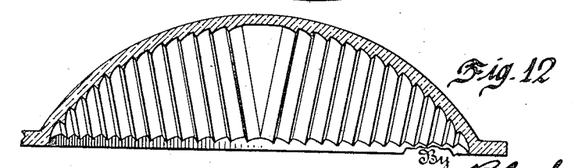
Figure 12 is is a section on line 12—12 of Figure 11.
Figure 13:
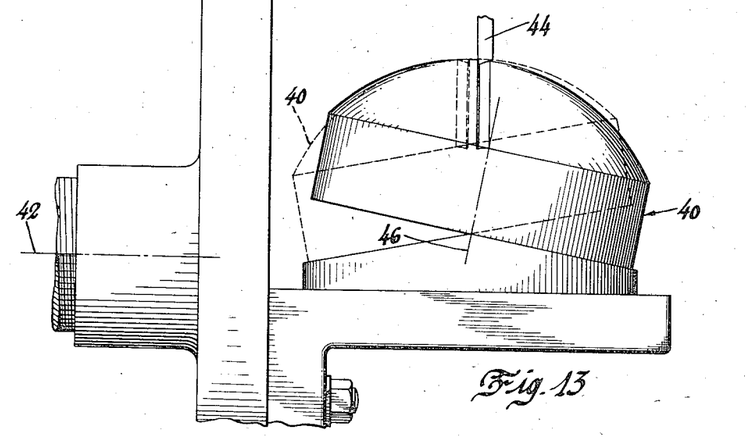
Figure 13 is a top plan view showing the method of cutting the flutes on the plunger used in making the lens.

A preferred application of this method of correction is shown in Figures 11 and 12, while in Figure 13 I have shown the method of making the plunger used in producing the lens. This method necessitates the use of asymmetric flutes all over the portions of the lens where correction is desired for the reason that this type of correction has opposite effects when applied to opposite halves of a flute. For this reason if a symmetrical light pattern is desired, it is necessary to provide the right half of the lens with asymmetric flutes spreading light in one direction and the left half of the lens with asymmetric flutes spreading light in the other direction, the two halves combining to produce the desired symmetrical beam. For the same reason the flutes on one side of the lens will be canted in the opposite direction from the flutes on the other side of the lens.

Figure 14:
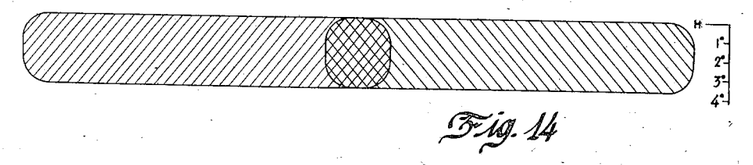
Figure 14 shows the beam pattern produced by the lens of Figure 11.

In Figures 11 and 12 I have shown a lens designed to give the symmetrical composite beam pattern shown in Figure 14. Referring to Figure 12 it will be noted that the right half of the lens bears asymmetrical flutes spreading light to the right of the road, and forming the right half of the pattern in Figure 14. The left half of the lens is provided with asymmetric flutes spreading light to the left of the road and forming the left half of the beam pattern of the same figure. It will be noted that the asymmetrical flutes in each case have been designed to provide a slight amount of overlap in the center of the beam. This provides against the possibility of a dark spot in the center of the beam in case of inaccuracies in filament position, or other manufacturing variation. Since the direction of dispersion is reversed on opposite sides of the flute center line, and since to secure overlap it is necessary to use a flute extending beyond the center line, there will be a certain amount of vertical dispersion in the case of the overlapping rays but by proper design this dispersion may be held within limits that make it unobjectionable. Since the dispersion in the main part of the beams is fully corrected and that in the overlapping portions is so slight as to be negligible, I have shown the beam pattern in Figure 14 as substantially horizontal. The correction for vertical dispersion is accomplished by canting the flutes as shown in Figure 11. This canting may be accomplished by machining the plunger in the manner shown in Figure 13. Here 40 indicates the cast iron blank from which the plunger is made for pressing the lenses. The plunger is mounted on the angle plate of the lathe which is mounted for rotation about axis indicated at 42. 44 indicates a tool bearing against the blank and cutting the flute as shown. 46 indicates the axis of the blank. In the manufacture of conventional vertical flutes the blank is mounted on the angle plate so that the axis 46 is at right angles to the axis of rotation 42. In order to make a canted flute such as shown in Figure 11 the blank 40 is mounted on the angle plate in the tilted position shown in full lines when flutes are being cut on the left side of the blank. When cutting the flutes on the right half of the lens the blank 40 is moved to the tilted position shown in dotted lines and a cutter is used of such shape as to form the asymmetrical flutes used on the right side of the lens.

It will be noted in Figure 11 that the portions of the flutes adjacent the horizontal diameter of the lens are substantially perpendicular to that diameter, and that owing to their curvature the canting of the flutes increases progressively toward the top and bottom of the lens. As a result of this the correction at the horizontal diameter is zero and increases to a maximum at the top and bottom. It is evident from the character of the beam pattern shown in Figure 14 that the distortion produced by vertical dispersion of rays has been completely removed. This is due to the fact that the correction accomplished by the treatment of flutes as shown in Figure 11 varies progressively in step with the vertical dispersion which it is designed to remove.

Figure 15:
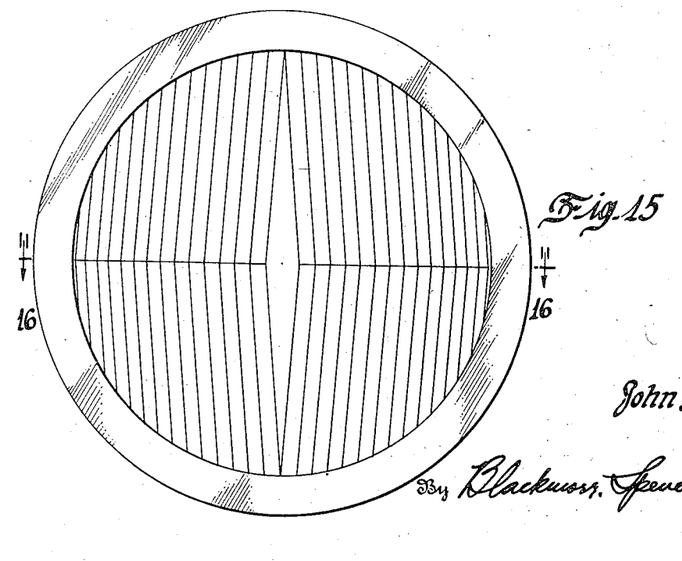
Figure 15 is a view looking from the back of a modified form of lens.
Figure 16:
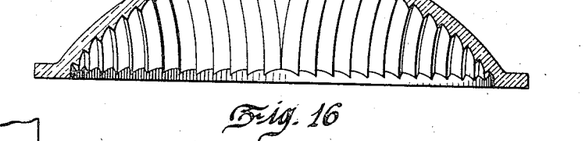
Figure 16 is a section on line 16—16 of Figure 15.
Figures 17, 18:
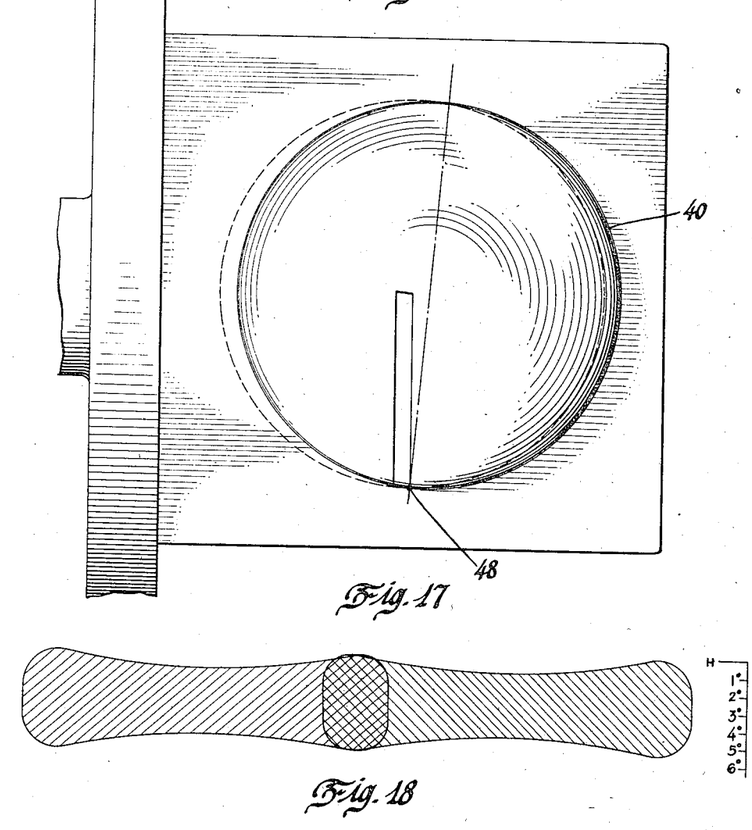
Figure 17 is a plan view showing the method of cutting the flutes on the plunger used in making the lens of Figure 15.
Figure 18 shows the beam pattern produced by the lens of Figure 15.

If it is sufficient to obtain simply an approximate correction of the error I may employ straight canted flutes as shown in Figures 15 and 16. The construction in these figures is the same in other respects as that described. In Figure 17 I have shown a method of machining the plunger blank 40 to produce the straight canted flutes. This figure is a top plan view of the plunger blank mounted on the angle plate and as shown in the figure the blank is pivoted at 48, the point of intersection of the circumference of the blank and the vertical diameter, to place it in position for cutting the flutes. Thus in cutting the flutes in the lower left quarter of the blank the blank is positioned on the solid lines, and in cutting the flutes on the lower right quarter, the blank is shifted to the position shown by dotted lines. In cutting the flutes on the respective top halves the blank is rotated on the angle plate 180°, and the previously mentioned operations are repeated.

The amount of tilting of the plunger on the angle plate will vary in accordance with the amount of correction to be applied to the lens.

In Figure 18 I have shown the beam pattern produced by the lens of Figures 15 and 16. The resultant pattern is made up of two parts, one from each side of the lens and each of the parts is of less depth at its center than at its ends. This results from the incomplete correction for vertical dispersion resulting from the use of straight canted flutes instead of curved flutes as in Figure 11. For some purposes this amount of vertical dispersion may be unobjectionable. By using flutes of proper radius of curvature and width and changing the angle of canting the distortion of the pattern may be increased or diminished as desired.

Figures 19, 20:
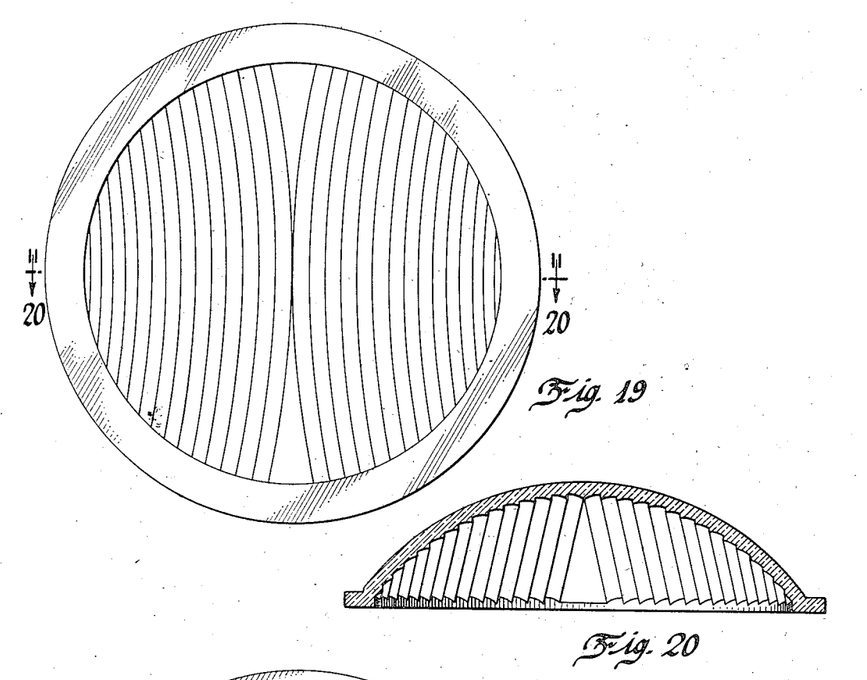
Figure 19 is a view looking from the back of another modified form of lens.
Figure 20 is a section on line 20—20 of Figure 19.

In Figures 19 and 20 I have shown a modification of the continuous type of correction shown in Figure 11. In this form of the invention the asymmetrical flutes on the right side of the lens project light to the left side of the road, and the left side of the lens is provided with asymmetric flutes to project light to the right side of the road. In this case it will be noted that the canting of the flutes is correspondingly reversed. Practically the same method of machining the plunger may be employed and so it will not be described. The beam pattern produced by this lens will be the same as that shown in Figure 14 except for the criss-crossing of the beams projected by the two halves of the lens.

It is obvious that instead of the curved flutes of Figure 19, I may employ straight canted flutes approximating curved flutes, just as in the case of the lens of Figure 15.

It also will be obvious that where an asymmetric pattern is desired it is but necessary to employ flutes of identical shape over the entire lens and to then cant the flutes in the same direction all the way across the lens. I have illustrated a lens of this sort in Figures 21 and 22. It is obvious, of course, that the construction may be reversed where it is desired to project the light to the opposite side of the road.

Figure 21:
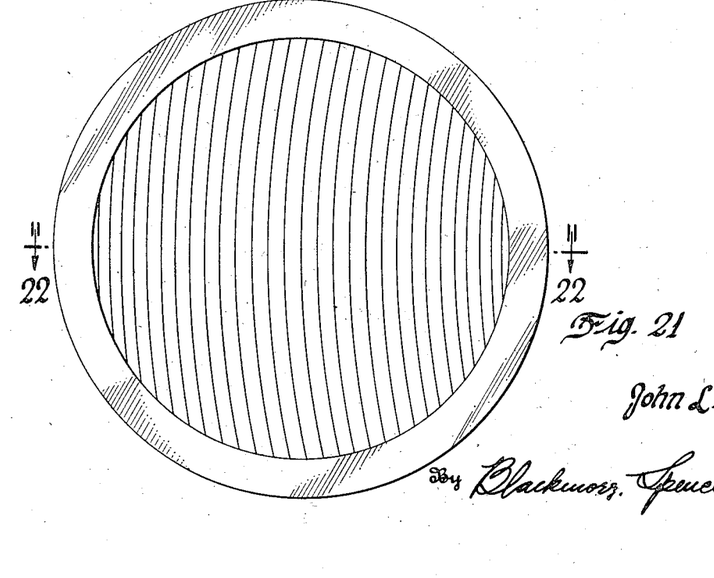
Figures 21 and 22 are views corresponding to Figures 19 and 20, respectively, but showing a further modification.
Figure 22:
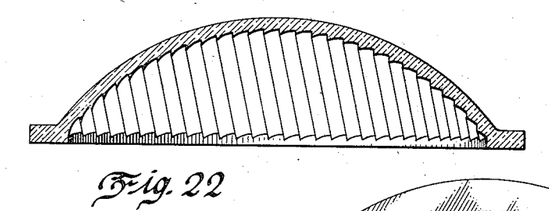

If an approximate correction is sufficient I may employ straight canted flutes in place of the curved flutes shown in Figure 21, the straight flutes having, of course, the same general direction of cant as the curved flutes of that figure.

In commercial design it will often be found desirable to confine the correction for vertical dispersion to the extreme top or bottom portions of the lens where the dispersion is greatest. I have shown such a construction in Figure 23 where the upper and intermediate zones of the lens are provided with asymmetrical flutes for throwing light to the left of the road. Here the flutes on the upper zone are canted like those in the upper left hand quadrant of Figure 15. The bottom zone of the lens is provided with asymmetrical canted flutes like those at the bottom of Figure 15 providing symmetrical distribution.

Figure 23:
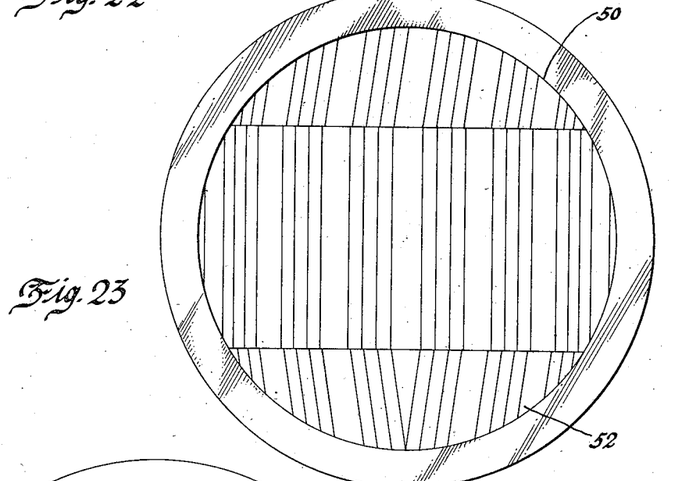
Figures 23 to 26 are rear views of further modifications of lens.

The lens of Figure 23 is especially designed for use in the asymmetrical lighting system described and claimed in the co-pending application of Clarence A. Michel and Howard C. Mead, Serial No. 630,809, filed August 29, 1932. In this system the lens illustrated in Figure 23 is preferably used on the right head lamp. The bottom zone of the lens of the left head lamp may be of the same construction shown in Figure 23, while the upper and intermediate zones are provided with asymmetrical flutes throwing light to the right of the road. The flutes on the upper section of the lens of the left headlamp would consequently be canted oppositely to the flutes on the upper section of the lens of Figure 23. Each lamp is provided with a filament on focus and a filament above focus. With the focal filaments in action the left side of the top of the beam is projected by the intermediate zone of the right headlamp while the right side of the top of the beam is projected by the intermediate zone of the left headlamp. The top zone of the right headlamp provides light further down on the left side of the combined beam while the top zone of the left headlamp provides light further down on the right side of the combined beam. In both lamps the bottom zone spreads light all the way across the road, helping build up the lower part of the combined beam. With the construction described upon shifting to the upper filament in the right headlamp the left side only of the beam is dropped giving an asymmetrical passing beam. When both of the upper filaments are employed a symmetrical lower beam is obtained. Reference is made to said Michel and Mead application for a more detailed description of the complete system.

My invention will also find especial application in the design of lens for use with the asymmetric lighting systems described and claimed in the prior application of Robert N. Falge and Charles E. Godley, Patent No. 1,929,111, granted October 3, 1933. However, it will be appreciated that my invention is not restricted to such uses but will have wide application to all types of curved lenses used in various relations.

In any of the lenses designed for use in the projection of two beams it may also be found desirable to use flutes of reduced spreading power over the central zones or at least over the sides of the central zones to provide a concentrated hot spot at the top of the beam.

Any of the method herein described may be used to correct for vertical dispersion in the case of any particular zone of a lens.

Figure 24:
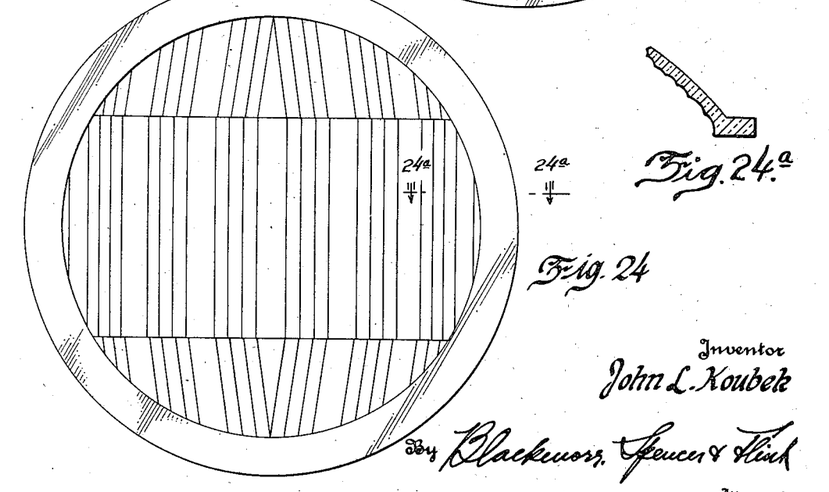

In Figure 24 I have shown a lens in which the extreme top and bottom zones are provided with asymmetrical flutes arranged to provide symmetrical distribution. These flutes and the method of correcting them are the same as shown in Figures 11 and 12. If preferred I may use instead the flute arrangements shown in Figures 15 or 19 or variants thereof.

The central zone of the lens shown in Figures 23 and 24 may be provided with symmetrical or asymmetrical flutes of such width and radii of curvature as may be desired.

Figure 24a illustrates the provision of symmetrical flutes on the central zone of the lens of Figure 24.

Instead of the arrangement shown at the top and bottom of figure 24 I may obtain a symmetrical beam from these sections by using asymmetrical flutes to criss-cross the rays from opposite sides of these sections of the lens, and correcting them for vertical dispersion in the manner shown in Figure 19.

Figure 25:
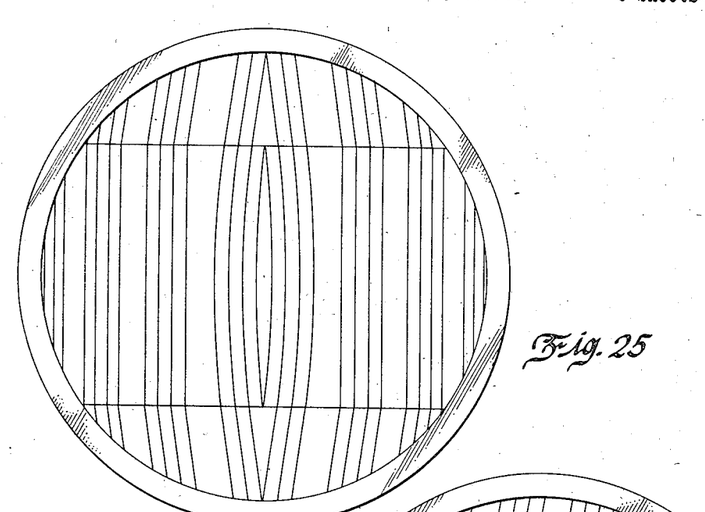

In Figure 25 I have shown a further modification in which the correction for vertical dispersion is carried throughout the center of the lens, from top to bottom. The flutes employed may be of the design shown in Figures 11 and 12. At the sides of the central zone I have shown vertically extending flutes which may be given any desired degree of spread.

Figure 26:
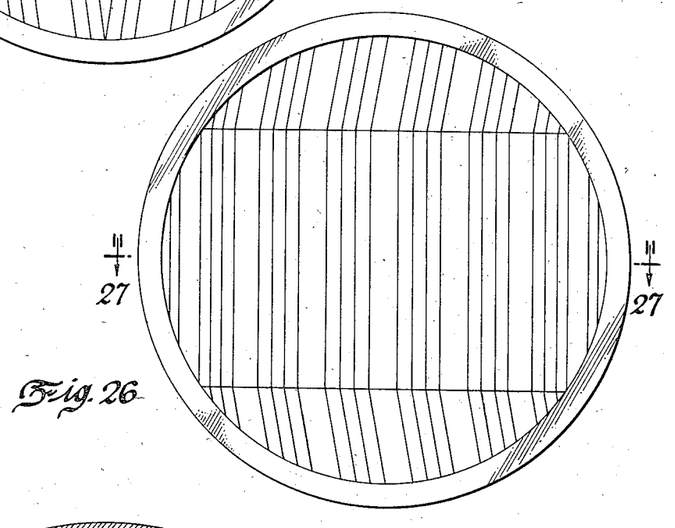
Figure 27:
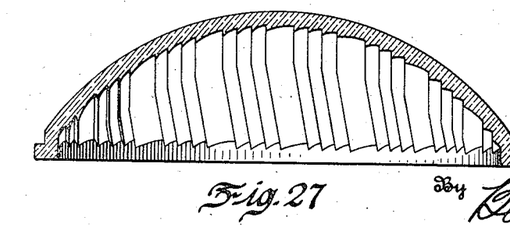
Figure 27 is a section on line 27—27 of Figure 26.
Figure 28:
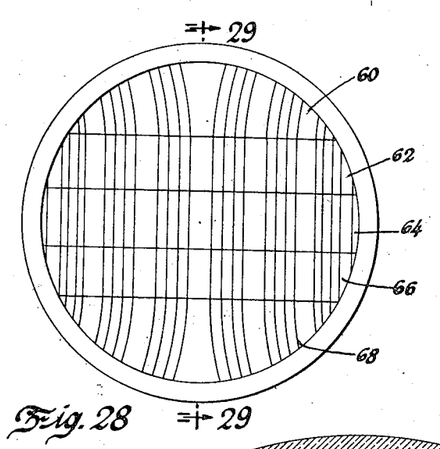
Figure 28 is a rear view of another modification of lens.
Figure 29:
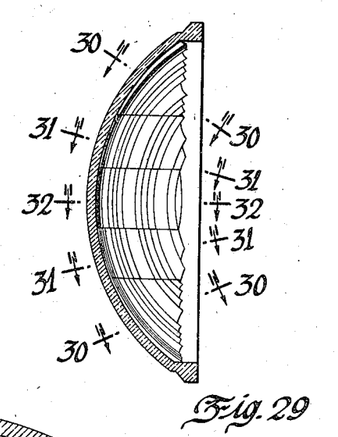
Figure 29 is a vertical section on line 29—29 of Figure 28.
Figure 30:
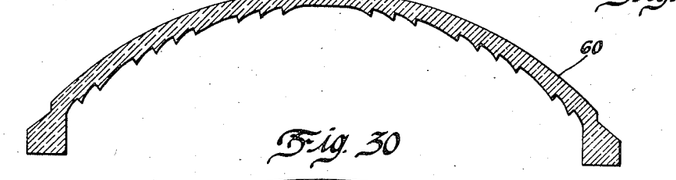
Figure 31:
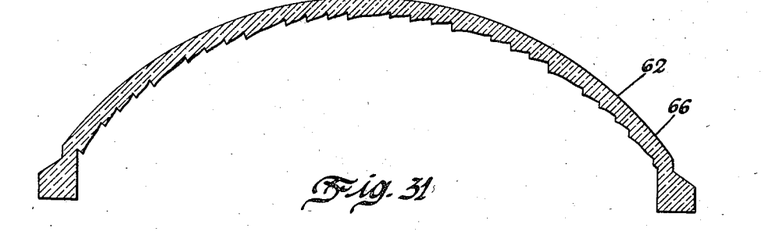
Figure 31 is a section on either of lines 31—31 of Figure 29.
Figure 32:
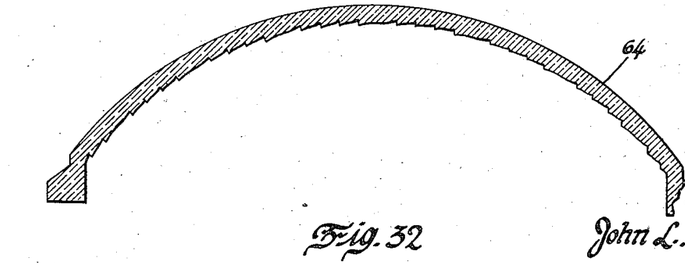
Figure 32 is a horizontal section through the lens taken on line 32—32 of Figure 29.

In Figures 26 and 27 I have shown a lens designed to project light to the left side of the road, but with the correction for vertical dispersion confined to the top and bottom zones of the lens. Obviously, reversed canting would be employed in the case of a lens designed to light the right side of the road.

The lens shown in Figures 28 to 32 is designed for use on the right headlamp to assist in producing either a high beam, higher on the left than on the right, or a symmetrical low beam. It is especially designed for use with a reflector having its top and bottom sections corresponding to sections 60 and 68 of the lens, formed to throw light downwardly, while the intermediate zones 62, 64, and 66 throw light substantially straight ahead. I prefer to use a reflector with the further modifications described and claimed in the application of Michel, Koubek, and Mead, Serial No. 716,574, filed March 21, 1934, in which the central zone 64 is parabolic, while zones 60 and 62 are axially displaced so that their foci are back of the focus of the central zone, while zones 66 and 68 are axially displaced so that their foci are in advance of the focus of the central zone. However, if preferred, I may employ a reflector of the type disclosed in Michel Patent No. 1,594,544, granted August 3, 1926, in which sections 62 and 66 are extended to the horizontal diameter of the lens.

With either of these types of reflectors shifting from a source on focus to a source above focus produces a drop in the top of the beam.

Having taken care of vertical distribution of light by reflector design, I control horizontal distribution by means of the lens. Thus, zones 60 and 68 are provided on opposite sides of the center line with oppositely facing half flutes projecting asymmetrical beams overlapping in the center to give a symmetrical pattern. These flutes are bowed outwardly from the vertical diameter through the lens to correct for vertical dispersion.

Zones 62, 64, and 66 are provided with asymmetrical S shaped flutes such as are described and claimed in the copending application of Robert N. Falge, Patent No. 1,950,978 granted March 13, 1934. These flutes spread light to the left of the road, the flutes on the central section and particularly on the sides of the central section concentrating light at the top of the beam. This design of flute possesses the advantage that the rays forming one side margin of the beam come from the center of the flute which can be formed more accurately by the usual pressing methods than can the edges of the flute.

It is obvious that all of the flutes herein disclosed may be given an S-shape if desired. It is also obvious that instead of caring for vertical distribution in the reflector this may be accomplished by providing suitable prisms on the lens.

Summing up the variables that determine the character of correction to be applied to the lens, it will be noted that for a lens of given diameter and radius of curvature, the correction will vary with the quadrant in which the flute is located, and with which half of the flute is used, whether the right half or the left half.

It will now be apparent that the direction of canting of the flutes depends upon whether I employ the portion of the flute to the right of the center line or the portion of the flute to the left of the center line, and also upon whether the flute is in the upper half or the lower half of the lens. The amount of canting needed to make a complete correction is also a minimum adjacent the horizontal center of the lens, and a maximum at the top and bottom.

In most of the lens designs just described no mention is made of the construction of flutes applied to the central zones. In general it will be found that the amount of vertical dispersion in the central zones will be so slight that correction will probably be unnecessary. It will also probably be found desirable to use flutes of less spread over the sides of the central zone than over the center thereof to concentrate light at the top of the beam in the manner described. However, it is obvious that correction may be readily made for vertical dispersion of rays from the central zone by employing any of the methods heretofore described.

In the case of any of the lens or cover glass designs so far described I may also add thereto proper down-bending prisms to obtain two beams from the lamp, a high beam and a low beam. This may be accomplished in known manner by providing down-bending prisms over the top and bottom portions of the reflector lying ahead of the focal plane, and, if desired, by providing slight down-bending prisms over the center of the central zone. The same result may be achieved by properly shaping the reflector.

In some cases it may also prove desirable to vary the width and radius of curvature of the flutes so as to use flutes of less spread adjacent top and bottom of the lens as described and claimed in my copending application Serial No. 676,821, above referred to, combining this method of correction with canting of the flutes as herein described.

While I have disclosed cover glasses of spherical curvature, it will be understood that this method of correction is applicable to all curved lenses, whatever be the type of curve, whether convex or concave and whether the curvature is simple or compound. It is likewise obvious that the correction may be applied to any or all portions of the cover glass, and it is to be understood that my claims are not to be construed as limited to their use over the entire surface.

In this application I have used directional terms such as "top," "bottom," "vertical" etc. It is understood that these terms are used in a relative sense only, for should the plane of projection of the beam be changed, it is obvious that the correction of the lens will be correspondingly changed only in a relative sense and so will not depart from the spirit of my invention.

I claim:

1. A curved cover glass for lamps provided with asymmetrical flutes arranged to spread substantially all of the light passing therethrough to one side of the flute axis, said flutes being canted with respect to the vertical to overcome vertical dispersion of rays and produce a horizontal beam, the angle of cant of the flutes increasing as the vertical extremities of the lens are approached.

2. A curved cover glass provided on one side of its vertical axis with asymmetrical flutes spreading substantially all of the light to one side of the flute axis and on the other side of the vertical axis with asymmetrical flutes spreading substantially all of the light to the opposite side of the flute axis, flutes on opposite sides of the vertical diameter and on the same side of the horizontal diameter being oppositely canted with respect to the vertical to overcome vertical dispersion of rays and produce a horizontal beam.

3. A curved cover glass provided on one side of its vertical axis with asymmetrical flutes spreading substantially all of the light to one side of the flute axis and on the other side of the vertical axis with asymmetrical flutes spreading substantially all of the light to the opposite side of the flute axis, flutes on opposite sides of the vertical diameter and on the same side of the horizontal diameter being oppositely canted with respect to the vertical to overcome vertical dispersion of rays and produce a horizontal beam, the angle of cant of the flutes increasing as the vertical extremities of the lens are approached.

4. A deeply curved concavo-convex cover glass, for lamps having means for projecting substantially parallel rays, provided with substantially vertically arranged asymmetrical flutes, said flutes being canted in a direction opposite the direction in which substantially parallel rays striking said lens would be deflected away from the horizontal plane by uncanted asymmetrical flutes, so as to produce a transversely elongated beam of light corrected for vertical dispersion.

5. A deeply curved concavo-convex cover glass having on its upper portion substantially vertically arranged asymmetrical light spreading flutes canted away from the side edge of the lens toward which their high sides extend, and having on its lower portion substantially vertically arranged asymmetrical light-spreading flutes canted toward the side edge of the lens toward which their high sides extend so as to correct for vertical dispersion.

6. A deeply curved concavo-convex cover glass comprising superimposed horizontally extending top, bottom and central zones, the central zone being provided with vertical flutes for spreading light laterally, said top zone being provided with substantially vertically arranged asymmetrical light spreading flutes canted away from the side edge of the lens toward which their high sides extend, and said bottom zone being provided with substantially vertically arranged asymmetrical light spreading flutes canted toward the side edge of the lens toward which their high sides extend so as to correct for vertical dispersion.

7. A deeply curved concavo-convex cover glass comprising superimposed horizontally extending top, bottom and central zones, the sides of the central zone being provided with vertical flutes for spreading light laterally, the top and bottom zones and the center of the central zone being provided with substantially vertically arranged asymmetrical flutes, the asymmetrical flutes on the upper half of the lens being canted away from the side edge of the lens toward which their high sides extend while the asymmetrical flutes on the lower half of the lens are canted toward the side edge of the lens toward which their high sides extend so as to correct for vertical dispersion.

8. A deeply curved concavo-convex cover glass having on its upper portion substantially vertically arranged asymmetrical light spreading flutes canted away from the side edge of the lens toward which their high sides extend, and having on its lower portion substantially vertically arranged asymmetrical light-spreading flutes canted toward the side edge of the lens toward which their high sides extend so as to correct for vertical dispersion, the central portion of said cover glass being provided with symmetrical flutes.

JOHN L. KOUBEK.